Patented Aug. 15, 1939

2,169,245

UNITED STATES PATENT OFFICE 2,169,245

GLYCEROL FERMENTATION PROCESS

Frank M. Hildebrandt, Baltimore, and Norris M. Erb, Riviera Beach, Md., assignors to U. S. Industrial Alcohol Co., New York, N. Y., a corporation of West Virginia No Drawing. Application June 30, 1937, Serial No. 151,178

6 Claims. (Cl. 195—38)

This invention relates to the production of glycerol by yeast fermentation of sugar solutions, with especial reference to molasses, particularly blackstrap molasses.

It is well known that alkalinization of a yeast fermentation increases the small amount of glycerol formed in the normal type of fermentation. It is also well known that glycerol production is increased if sodium sulfite is added to a yeast fermentation to combine with the acetaldehyde formed as an intermediate. Attempts have been made to utilize these possibilities in a commercial way, but up to the present time the processes used have had only a limited degree of success.

Practically all of the fermentation glycerol produced commercially has been from pure sugar solutions with nutrient salts added. The fermentation difficulties associated with blackstrap molasses added to the difficulty of recovery of the glycerol have prevented any extended use of molasses as a raw material. This has been the case in spite of its low cost as a source of sugar. Processes for the production of glycerol by fermentation have not only had to use pure sugar, but very large amounts of yeast have been used, so large that this becomes one of the most costly ingredients of the mash.

Various procedures have been proposed utilizing sulfite, soda ash or other alkalinizing agents, one or more, but with blackstrap molasses as a raw material, difficulty is met in operating them. The fermentation is, for instance, materially slowed down by alkali additions, thus introducing an infection hazard in plant operation. Overdoses of alkalinizing substances frequently stop the fermentation permanently, making it difficult or impossible to salvage the sugar, which involves considerable loss.

The degree of sensitivity to doses of alkali varies from run to run. Therefore, even if the method of adding the alkali is kept the same, one cannot be sure the fermentation will give a constant result. Such uncertainty renders the ordinary alkaline fermentation procedure of little practical value since it may be so readily upset by slight irregularities necessarily associated with large-scale operation.

We have found that the disadvantages noted may be overcome by taking account of the fact that they are all related to interference with the cell multiplication phase of the fermentation. Therefore, if one can conduct the fermentation so that all or the major portion of the yeast cells which will be required to effect the fermentation is pre-formed before the addition of the alkalinizing agent or agents, the subsequent enzymatic conversion of sugar to alcohol and glycerol will proceed at a rapid rate.

This has been accomplished by the application of the fermentation process described in our copending application Serial No. 151,177 to a substrate modified by the addition of an agent having the property of increasing the glycerol-alcohol ratio. The improvement includes the growing of a yeast crop in an aerated low-sugar mash, preferably in a medium consisting of still residue from a previous ethyl alcohol fermentation containing about 1.5 grams of residual sugar per 100 cc. This crop is obtained by seeding the slop or still residue with a small quantity of yeast, say 0.1% to 2% by volume. The seeded mash is then aerated from 12 to 20 hours or as long as is necessary to produce maximum yeast growth. Nutrients such as phosphates, ammonia, ammonium salts, etc. may be added if desired to promote the yeast growth. When the crop has been developed, sugar in the form of molasses or other fermentable material is added in sufficient quantity to increase the sugar concentration to between 15–20 grams per 100 cc. Aeration is then discontinued and the glycerol-alcohol phase of the operation begins. When the fermentation is gassing vigorously, which in this type of fermentation takes from 15 minutes to one hour after the sugar concentration has been adjusted, the alkalinization or sulfite treatment may be begun. We have found, for instance, that a quantity of a suitable alkali as high as 40% of the sugar in the mash may be added in a single dose. When such an amount is added to a yeast fermentation as usually carried out, it has to be divided into several doses and very painstaking control must be practiced in order to avoid complete stoppage of the fermentation.

The following illustrations bring out the greater tolerance of the improved process for large doses of alkaline salts such as sodium carbonate and sodium sulfite.

| Type of seeding | Percent $Na_2CO_3$ sugar basis | Percent glycerol on sugar basis |
|---|---|---|
| 4%—standard | 40 (single dose) | 5.1 |
| Pre-grown yeast crop | 40 (single dose) | 17.3 |

| Type of seeding | Percent sodium sulfite sugar basis | Percent glycerol on sugar basis |
|---|---|---|
| 4%—standard | 32.6 (single dose) | 15.7 |
| Pre-grown yeast crop | 32.6 (single dose) | 20.3 |

It is to be understood that neither one of the above examples is given as an illustration of the optimum conditions for glycerol production but simply as illustrations of the greater sensitivity of fermentations in which cell multiplication is required to take place in the presence of high sulfite and hydroxyl-ion concentration. We do not, for instance, recommend adding the alkaline salts in a single dose if the best results are to be obtained in the glycerol fermentation. Addition at intervals is to be preferred, but our improved process avoids the hazard of stopping the fermentation by an overdose of alkali. Best results are obtained by so regulating the addition of one or more alkalinizing agents in the second stage of the process, as by adding these agents in successive portions, that the pH of the mash of the second stage of the process is kept below 9.0 throughout this stage. Any suitable non-toxic alkalinizing agent having the property of causing an increase in the production of glycerol may be employed, for example, sodium carbonate, potassium carbonate, sodium sulfite, potassium sulfite, ammonia, and the like.

A special advantage lies in the use of still waste (or slop) from a previous ethyl alcohol fermentation as the medium for the yeast building stage, on account of the fact that this waste provides sugar for the reproductive phase of the yeast. A further advantage arises from the presence of salts in the spent waste. There is definite indication in the literature and in practice that high concentrations of any non-toxic salts increase glycerol production. There is also an advantage in that the solids present in the slop materially increase the buffer capacity of the second stage of the fermentation. Thus, it is easier to maintain the desired hydroxyl-ion concentration, with a consequent saving in materials used for alkalinization. In the highly buffered medium, large salt additions do not bring about a harmful degree of alkalinity.

The benefit obtained by the use of a yeast crop grown in spent waste containing approximately 1.5 grams per 100 cc. sugars is shown in the following illustration. A yeast crop grown in a dilute molasses mash containing approximately the same amount of sugar as the spent waste but lacking the buffer solids is used as a basis of comparison. The alkaline material used here was soda ash and the sugar concentration was built up in the manner described above after growing the yeast and before adding the alkali.

| Growing medium for yeast crop | Percent alkaline salt sugar basis, added in one dose | Percent glycerol on sugar basis |
|---|---|---|
| Dilute molasses mash | 10 | 8.5 |
| Spent waste | 10 | 14.9 |
| Dilute molasses mash | 20 | 12.7 |
| Spent waste | 20 | 18.6 |
| Dilute molasses mash | 30 | 4.7 |
| Spent waste | 30 | 19.8 |

It will be noted from the above that there is an increase in the yield of glycerol when yeast grown in spent waste is used. Furthermore, the increased buffer capacity of the spent waste is seen to be especially effective when the amount of alkalinizing salt is increased to 30%. This amount resulted in over-alkalinization where the yeast crop was grown in dilute unbuffered molasses but not in the yeast grown in spent waste with its high content of buffering materials.

We have found that all alkalinizing substances as well as sodium sulfite interfere with cell multiplication when a critical concentration is reached. Our process, involving as it does the growing of a sufficient number of yeast cells to complete the enzymatic conversion of the carbohydrate in the final fermentation, may obviously be used with advantage regardless of the alkalinizing agent employed.

While the advantages of the invention are most pronounced when slop from an ethyl alcohol fermentation is used to form practically all or at least a large part of the mash for the yeast crop growing stage of the process, and molasses, either diluted or undiluted to bring up the sugar concentration for the second stage of the process, other materials may be used. Thus, if the aerated first stage mash is dilute molasses or other dilute sugar solution, the advantage will remain that all or most of the yeast crop will be grown in a favorable medium and under favorable conditions, whereas if the yeast multiplication and the fermentation were carried out in one step in a relatively high sugar medium the operation would be less economic. The use of blackstrap for raising the sugar content of the mash preparatory to the true fermentation stage is desirable because of the low cost of the molasses, but other sugar-containing materials may be employed for the purpose.

An example of practical procedure under the process is as follows:

541 gallons of still residue from an ethyl fermentation was cooled to 90° F. and put in a clean fermentation tank and 2 lbs. of ammonium sulfate was added. This mash was seeded with 1 gallon of active yeast and aerated for 16 hours. At this time examination under the microscope showed a large number of actively budding yeast cells, and molasses was added to the tank so as to bring the volume up to 661 gallons, with a sugar concentration of 15.9 grams per 100 cc. 150 lbs. soda ash was added in six 25-lb. doses over a period of 36 hours, and the fermentation was allowed to go to completion. It was analyzed at 63 hours and gave 124 lbs. of glycerol and 289 lbs. of alcohol.

We claim:

1. A process for the production of glycerol and ethanol by yeast fermentation, which comprises seeding a mash of low sugar content with yeast, aerating this mash until substantially all the yeast crop for the glycerol-ethanol fermentation is grown, then greatly increasing the sugar content of the mash, stopping the aeration, and carrying the glycerol-ethanol fermentation to completion in the presence of an agent having the property of causing an increase in the glycerol-ethanol ratio, which agent is introduced into the mash after substantially all the yeast crop has been grown.

2. A process for the production of glycerol and ethanol by yeast fermentation, which comprises seeding a mash of low sugar content with yeast, aerating this mash until substantially all the yeast crop for the glycerol-ethanol fermentation is grown, then greatly increasing the sugar content of the mash, stopping the aeration, and not until after substantially all the yeast crop has been grown and vigorous fermentation has set in, adding an agent having the property of causing an increase in the ratio of glycerol to ethanol produced by the fermentation.

3. A process for the production of glycerol and ethanol by yeast fermentation, as set forth in claim 1, wherein the mash of low sugar content in which the yeast crop is grown consists largely of still residue.

4. A process for the production of glycerol and ethanol by yeast fermentation, as set forth in claim 1, wherein following the growth of the yeast crop, the sugar content of the mash is increased by the addition of molasses.

5. A process for the production of glycerol and ethanol by yeast fermentation, as set forth in claim 1, wherein the growth of the yeast crop is carried out in a mash consisting largely of a molasses fermentation still residue, and after the growth of the yeast crop, molasses is added to the mash to provide sugar for conversion to glycerol and ethanol.

6. A process for the production of glycerol and ethanol, as set forth in claim 1, wherein the sugar content of the mash is increased to over 15 grams of sugar per 100 cc. of mash.

FRANK M. HILDEBRANDT.
NORRIS M. ERB.